(12) United States Patent
Akiyama et al.

(10) Patent No.: US 9,933,572 B2
(45) Date of Patent: Apr. 3, 2018

(54) FUSION SPLICER

(71) Applicants: FURUKAWA ELECTRIC CO., LTD., Tokyo (JP); SEIWA GIKEN INC., Tokyo (JP)

(72) Inventors: Tomohiro Akiyama, Tokyo (JP); Takashi Tanaka, Tokyo (JP); Kenji Mori, Tokyo (JP)

(73) Assignees: FURUKAWA ELECTRIC CO., LTD., Tokyo (JP); SEIWA GIKEN INC., Tokyo (JP)

( * ) Notice: Subject to any disclaimer, the term of this patent is extended or adjusted under 35 U.S.C. 154(b) by 14 days.

(21) Appl. No.: 15/052,703

(22) Filed: Feb. 24, 2016

(65) Prior Publication Data
US 2017/0242193 A1    Aug. 24, 2017

(51) Int. Cl.
*G02B 6/255* (2006.01)
*H01B 5/02* (2006.01)
(Continued)

(52) U.S. Cl.
CPC ........... *G02B 6/2555* (2013.01); *B23K 11/10* (2013.01); *B23K 11/16* (2013.01); *G02B 6/2553* (2013.01); *H01B 5/02* (2013.01)

(58) Field of Classification Search
CPC ........................ G02B 6/2553; G02B 6/2555
See application file for complete search history.

(56) References Cited

U.S. PATENT DOCUMENTS 4,276,113 A    6/1981    Carlsen et al.
4,715,876 A    12/1987   Osaka et al.
(Continued)

FOREIGN PATENT DOCUMENTS

JP    61-106904 U    7/1986
JP    3-90205 U      9/1991
(Continued)

OTHER PUBLICATIONS

Japanese Office Action dated Dec. 20, 2016 in Patent Application No. 2014-245926 (English Translation Only).
(Continued)

*Primary Examiner* — Rhonda Peace
(74) *Attorney, Agent, or Firm* — Oblon, McClelland, Maier & Neustadt, L.L.P.

(57) ABSTRACT

The base member 3 can be attached to and detached from a base-holding member 5 without using tools and the like. The base-holding member 5 has a positioning mechanism that decides the position of the base member 3 on the base-holding member 5. Here, a reference part that decides the position of the base member 3 on the base-holding member 5 in a direction parallel to an optical fiber installation surface 2, which is an upper surface of the base member 3, is called a horizontal positioning reference part. Also, a reference part that decides the position of the base member 3 on the base-holding member in a direction vertical to the optical fiber installation surface 2 (the direction vertical to the horizontal positioning reference part), which is the upper surface of the base member 3, is called a vertical positioning reference part 6. That is, the horizontal positioning reference part and the vertical positioning reference part 6 are provided on the base-holding member 5.

14 Claims, 12 Drawing Sheets

(51) Int. Cl.
*B23K 11/10* (2006.01)
*B23K 11/16* (2006.01)

(56) References Cited

U.S. PATENT DOCUMENTS

| | | | |
|---|---|---|---|
| 5,457,765 A | 10/1995 | Suzuki et al. | |
| 5,524,163 A | 6/1996 | Kobayashi et al. | |
| 6,034,718 A * | 3/2000 | Hattori | G01M 11/37 348/125 |
| 6,467,973 B2 | 10/2002 | Takahashi et al. | |
| 6,890,109 B2 * | 5/2005 | Arima | G02B 6/2555 385/136 |
| 6,976,796 B2 * | 12/2005 | Koike | G02B 6/2551 385/136 |
| 7,848,609 B2 * | 12/2010 | Meitzler | G02B 6/2553 385/137 |
| 8,254,743 B2 * | 8/2012 | Sato | G02B 6/2555 385/137 |
| 2007/0053648 A1 | 3/2007 | Sasaki et al. | |
| 2013/0195415 A1 * | 8/2013 | Barnes | G02B 6/2555 385/135 |
| 2013/0205835 A1 * | 8/2013 | Giaretta | G02B 6/25 65/378 |
| 2013/0277356 A1 * | 10/2013 | Sato | G02B 6/2551 219/383 |
| 2014/0131326 A1 * | 5/2014 | Sato | G02B 6/2553 219/121.58 |
| 2014/0165657 A1 | 6/2014 | Sato | |

FOREIGN PATENT DOCUMENTS

| | | |
|---|---|---|
| JP | 6-51149 A | 2/1994 |
| JP | H07-084141 A | 3/1995 |
| JP | 2001-502067 A | 2/2001 |
| JP | 2003-014974 A | 1/2003 |
| JP | 2004-184543 | 7/2004 |
| JP | 2005-234555 A1 | 9/2005 |
| JP | 2008-116840 A | 5/2008 |
| JP | 2010-72245 A1 | 4/2010 |
| WO | WO 98/12587 A1 | 3/1998 |

OTHER PUBLICATIONS

Japanese Office Action dated Jan. 24, 2017 in Patent Application No. 2014-245934 (English Translation Only).
Decision to Grant issued in corresponding Japanese Application No. 2014-245926 dated Aug. 1, 2017 (drafted Jul. 25, 2017) with English translation.
Non-Final Office Action issued in U.S. Appl. No. 15/429,580 dated Jun. 12, 2017.

* cited by examiner

[Figure 1]
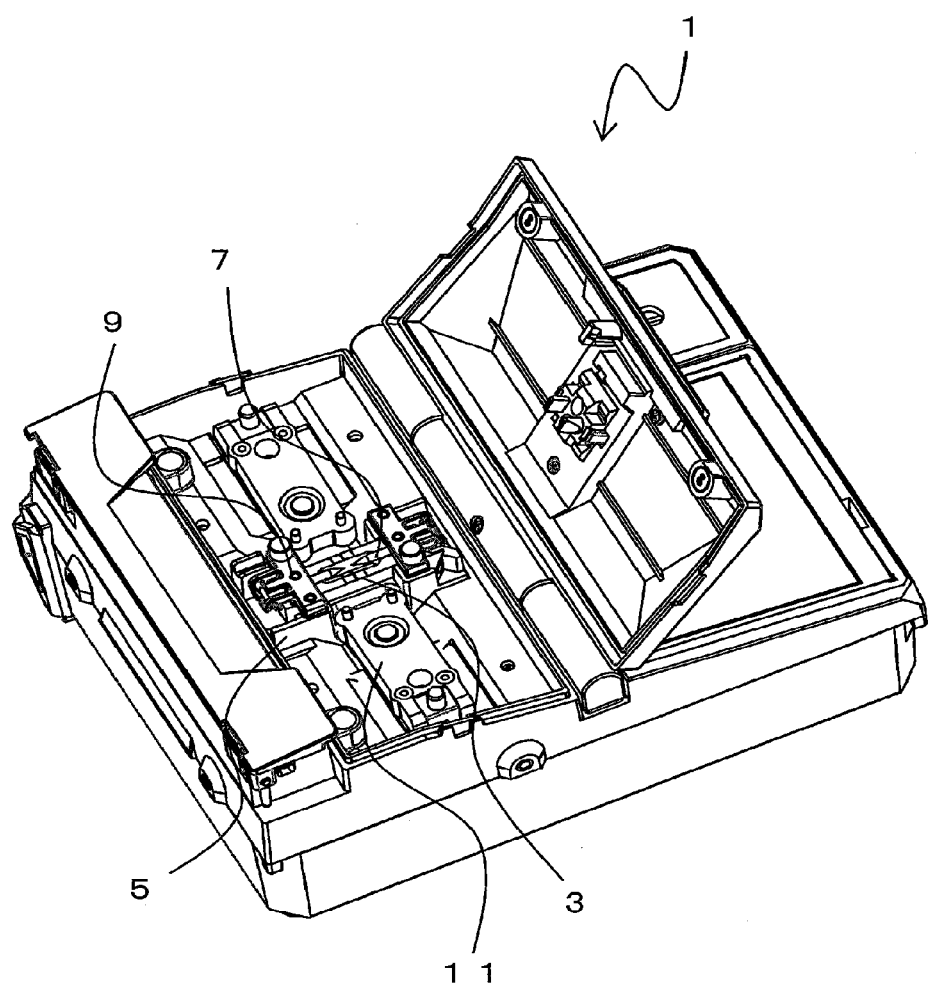

[Figure 2]
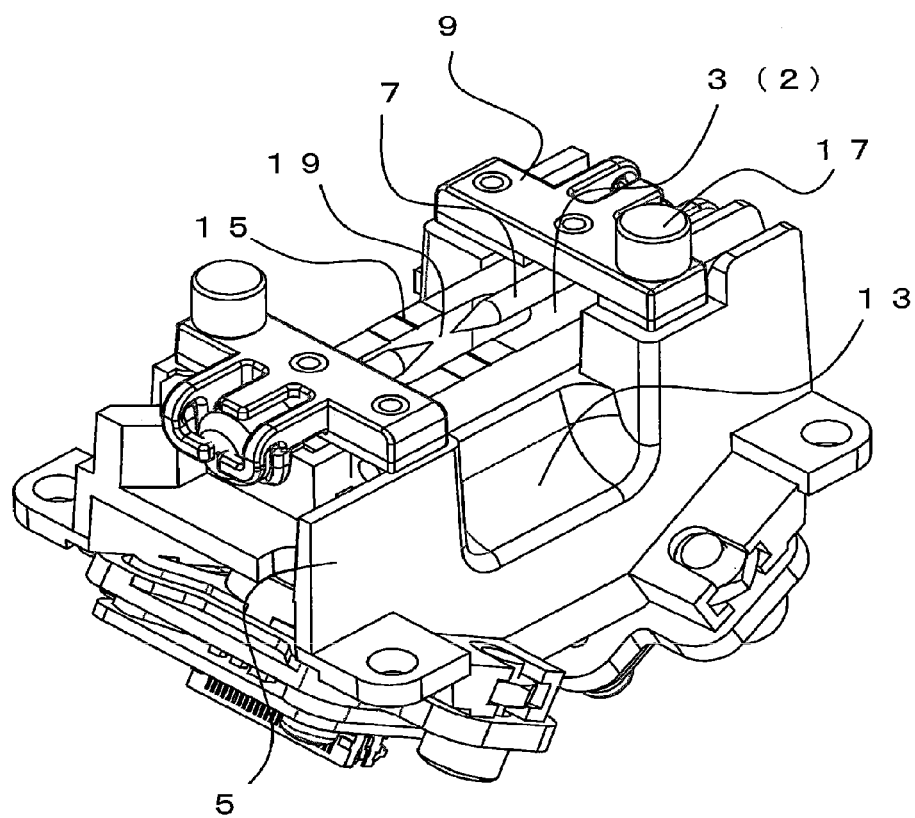

[Figure 3]
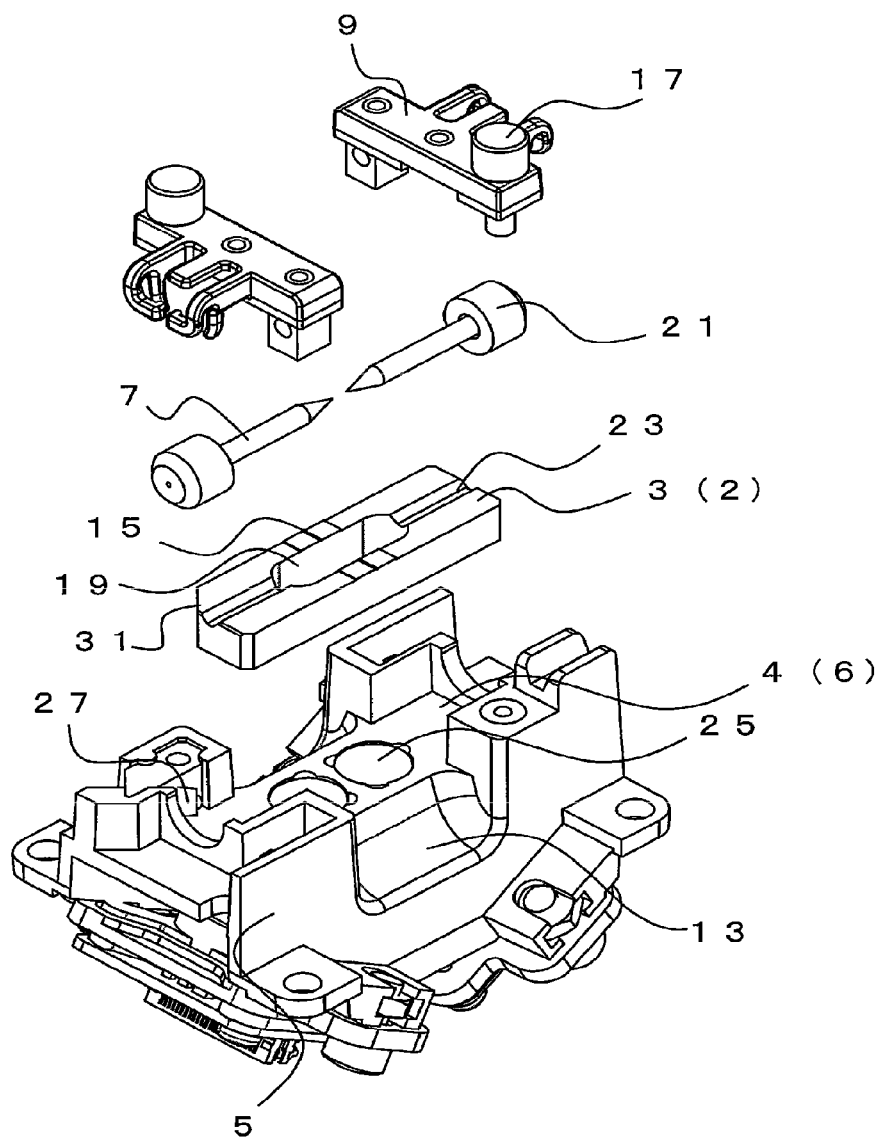

[Figure 4]
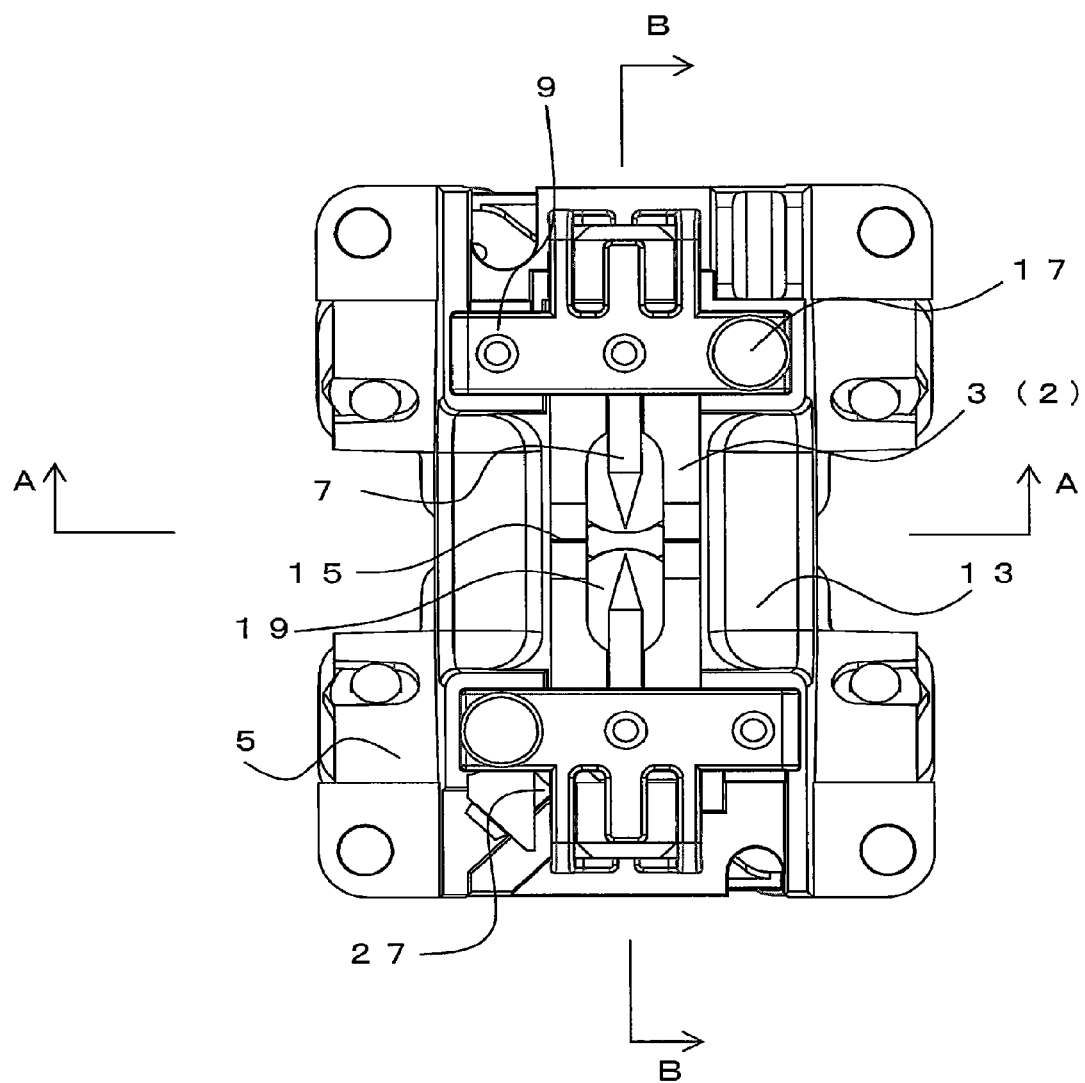

[Figure 5]
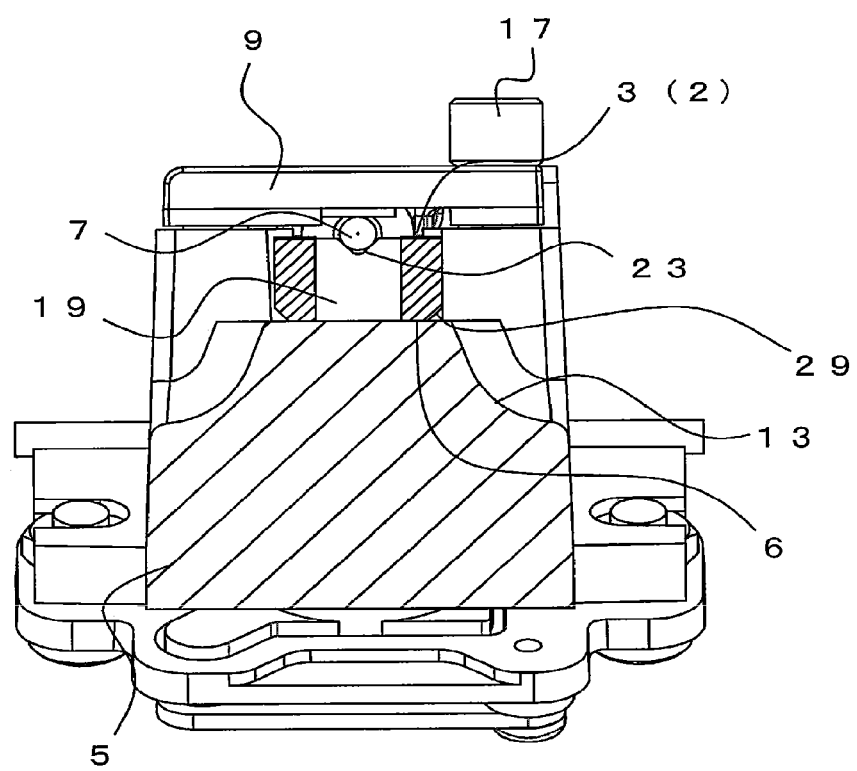

[Figure 6 (a)]
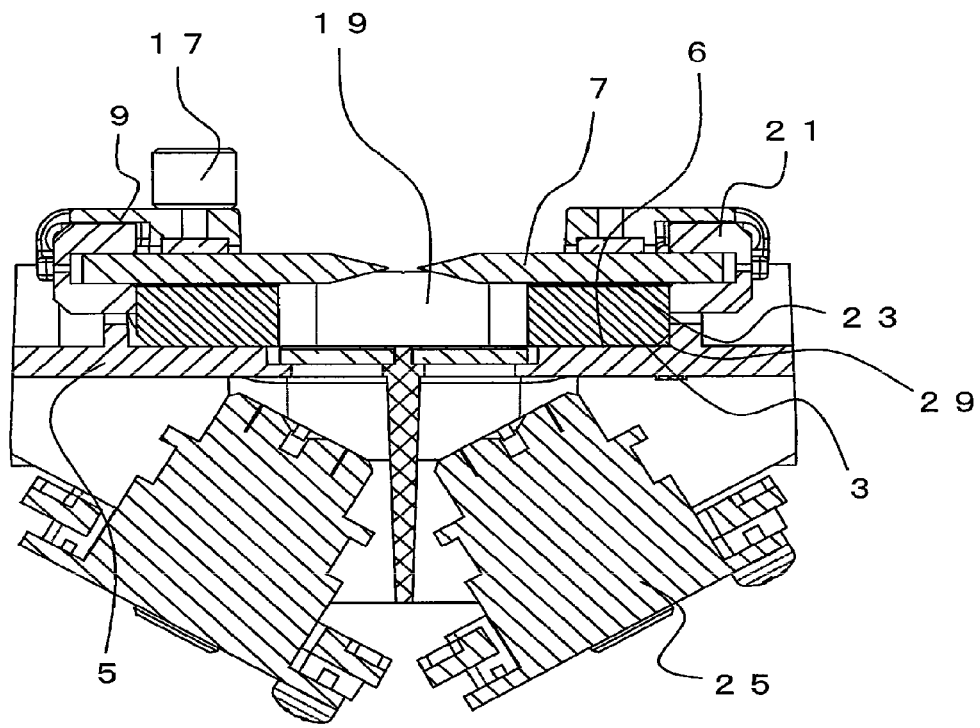
[Figure 6 (b)]
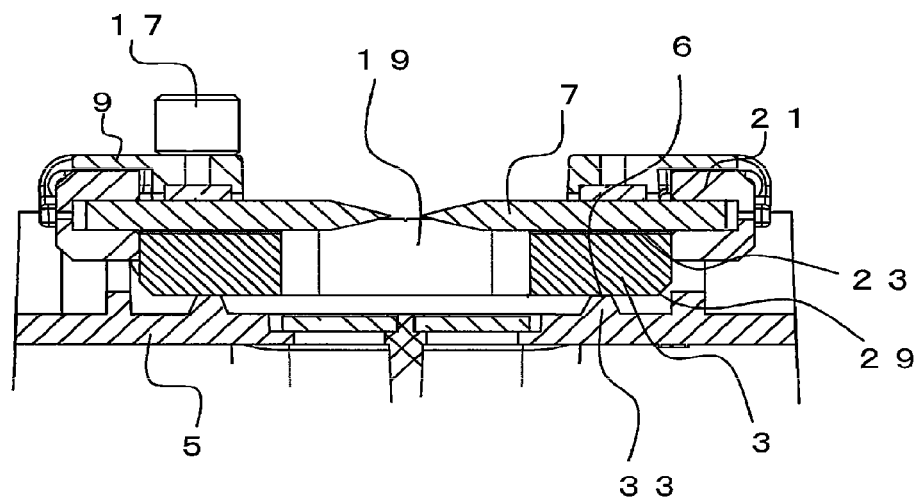

[Figure 7 (a)]
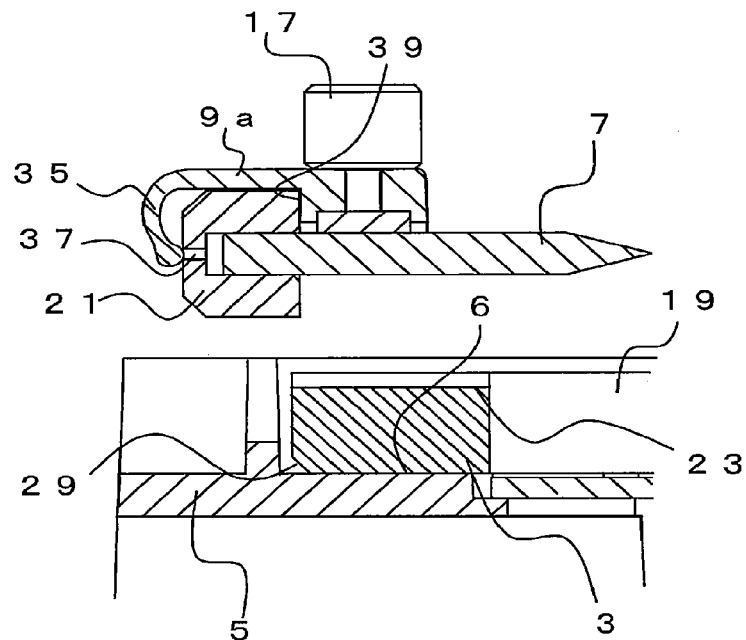
[Figure 7 (b)]
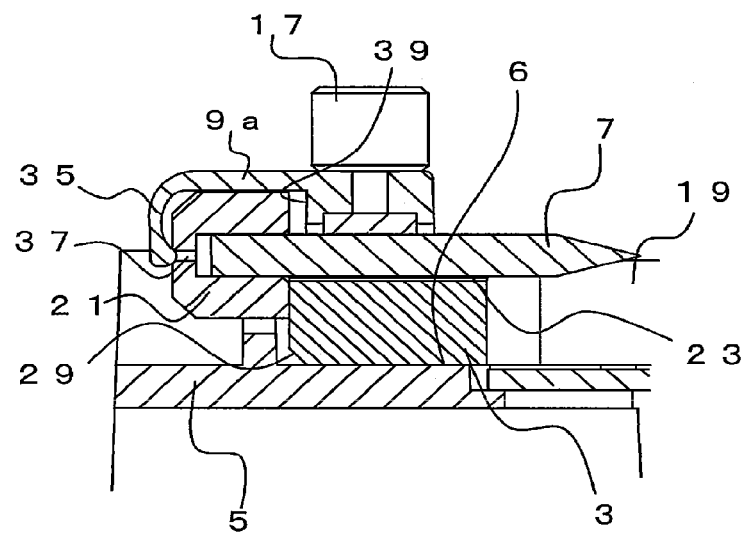

[Figure 8]
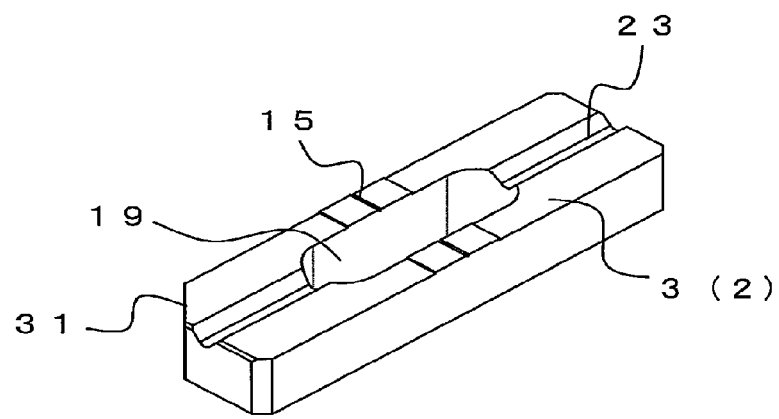

【Figure 9 (a)】
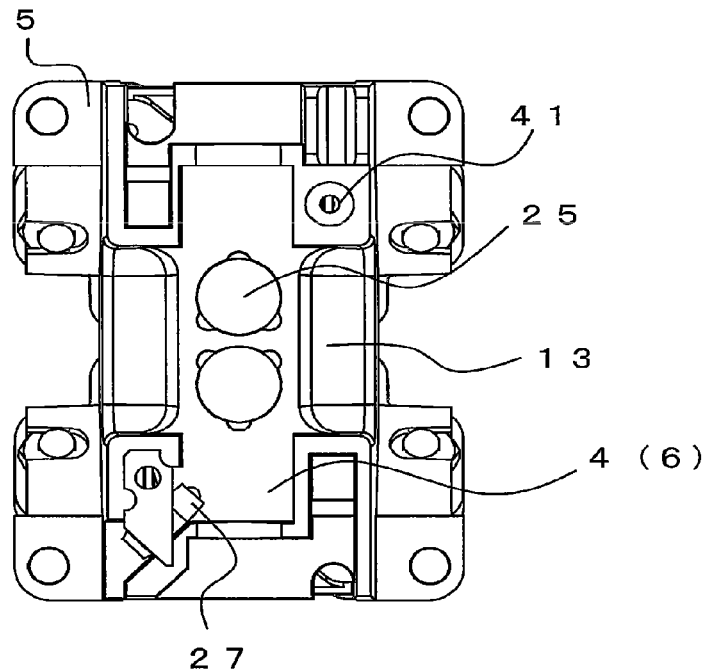
【Figure 9 (b)】
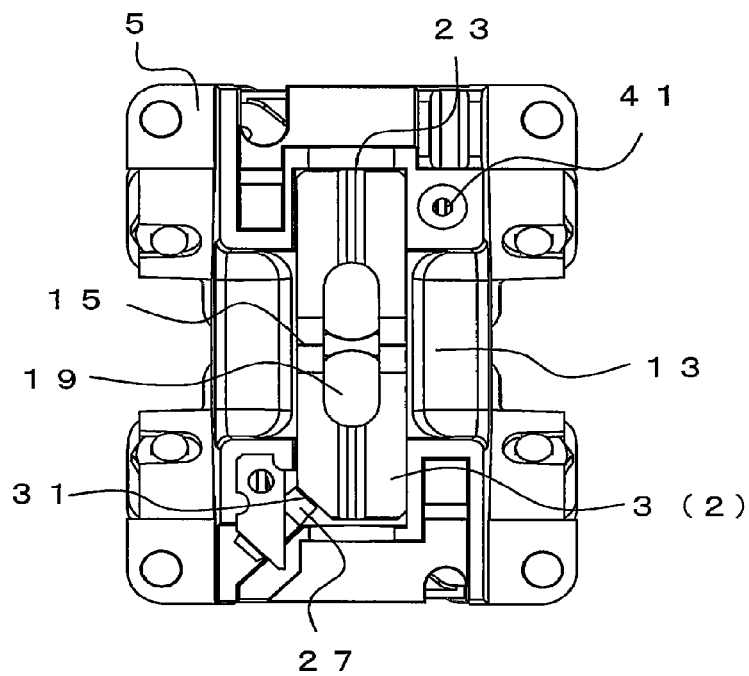

[Figure 10 (a)]
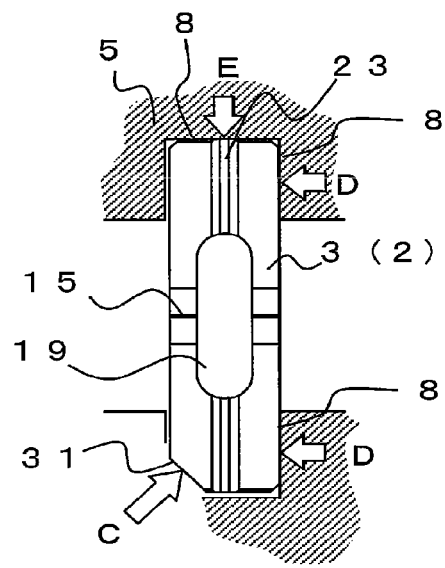
[Figure 10 (b)]
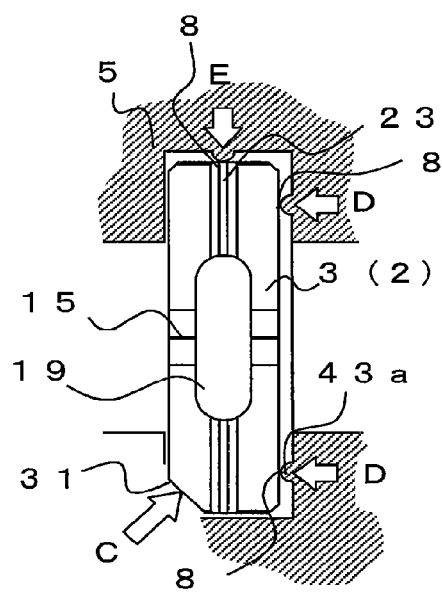

[Figure 10 (c)]
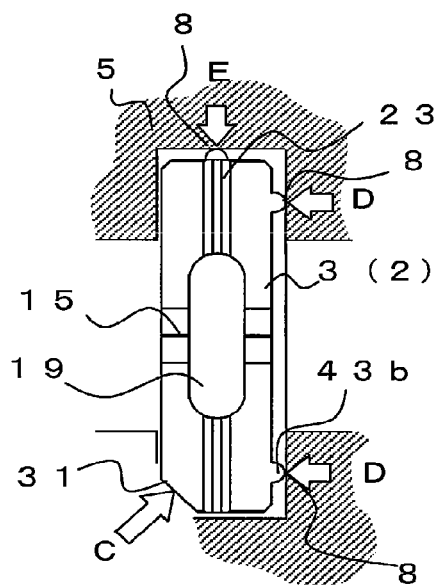

【Figure 11 (a)】
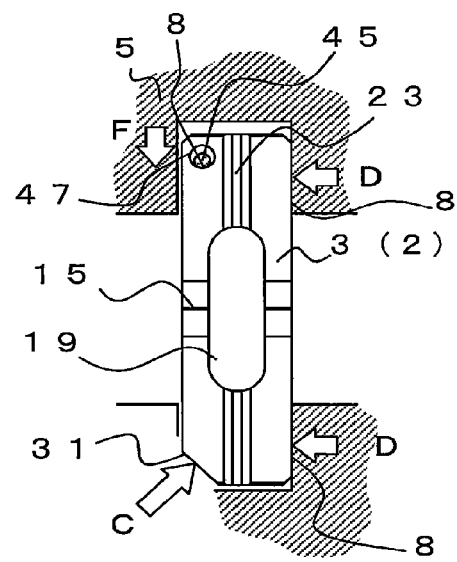
【Figure 11 (b)】
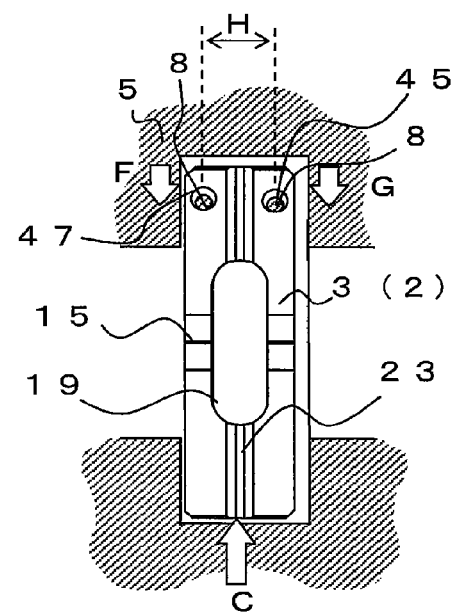

FUSION SPLICER

TECHNICAL FIELD OF THE INVENTION

This invention relates to a fusion splicer.

CROSS-REFERENCE TO RELATED APPLICATIONS

The content of the present disclosure was published on Jul. 16, 2015 as part of the publication of JP2013-251008 (JP2014-245934), the inventors of which are also listed as inventors in the present disclosure.

BACKGROUND OF THE INVENTION

Fusion splicers are used for splicing optical fibers. In a fusion splicer, optical fibers held in a pair of holders are butted together, placed in between electrodes, and spliced together by fusing the ends of the optical fibers by arc.

When splicing optical fibers, it is necessary to accurately position the ends of the optical fibers. Therefore, optical fibers are usually placed and positioned in V-shaped grooves formed on a supporting member.

As such a fusion splicer, for example, a fusion splicer in which a supporting member that supports optical fibers is integrally formed and fixed to the main body is used (Patent Document 1 for example).

RELATED ART

Patent Documents

[Patent Document 1] Japanese Unexamined Patent Application Publication No. 2004-184543 (JP-A-2004-184543)

SUMMARY OF THE INVENTION

Problems to be Solved by the Invention

In recent years, varieties of optical fibers and optical fiber tape core wires are diversified, and optical fibers with various outer diameters and optical fiber tape core wires with various pitches have been in use. On a supporting member that supports optical fibers at the time of fusion, V-shaped grooves corresponding to outer diameters and pitches of the optical fibers to be fused are formed. For fusion splicing optical fibers with different outer diameters or pitches, it is necessary to prepare different fusion splicers corresponding to each of the outer diameters or pitches respectively.

Also, although it is possible to disassemble a fusion splicer to remove and exchange the supporting member, the supporting member is fixed to the main body so that the exchanging operation is difficult and requires special skills, limiting its operators. Also, when attaching the supporting member, there is a possibility that position shifting of the supporting member may occur. The position shifting of the supporting member may cause a position shifting between the optical fibers facing each other.

The present invention was achieved in view of such problems. Its object is to provide a fusion splicer that can fuse optical fibers of various types together.

Means for Solving Problems

To achieve the above object, the present invention provides a fusion splicer that splices optical fibers together, the fusion splicer comprising a base member having grooves to hold optical fibers and a base-holding member that holds the base member. The base member can be attached to and detached from the base-holding member. On the base-holding member, a horizontal positioning reference part, which decides the position of the base member on the base-holding member in a direction parallel to an optical fiber installation surface on the base member, and a vertical positioning reference part, which decides the position of the base member on the base-holding member in a direction vertical to the optical fiber installation surface on the base member, are provided.

BRIEF DESCRIPTION OF DRAWINGS

FIG. 1 is a perspective view showing a fusion splicer 1.

FIG. 2 is a perspective view showing a base-holding member 5 holding a base member 3.

FIG. 3 is an exploded perspective view showing the base member 3, base-holding member 5, and the like.

FIG. 4 is a plan view showing the base-holding member 5 holding the base member 3.

FIG. 5 is a cross sectional view of A-A line in FIG. 4.

FIG. 6($a$) is a cross sectional view of B-B line in FIG. 4.

FIG. 6($b$) shows another embodiment of FIG. 6($a$).

FIG. 7($a$) is a cross sectional view showing a state in which an electrode-holding member 9$a$ holds an electrode rod 7.

FIG. 7($b$) is a cross sectional view showing a state in which the electrode-holding member 9$a$ is fixed to the base-holding member 5.

FIG. 8 is a perspective view showing the base member 3.

FIG. 9($a$) is a plan view showing the base-holding member 5.

FIG. 9($b$) is a plan view showing a state in which the base member 3 is disposed on the base-holding member 5.

FIG. 10($a$) shows a positioning state of the base member 3.

FIG. 10($b$) shows a positioning state of the base member 3.

FIG. 10($c$) shows a positioning state of the base member 3.

FIG. 11($a$) shows a positioning state of the base member 3.

FIG. 11($b$) shows a positioning state of the base member 3.

DESCRIPTION OF SOME EMBODIMENTS

Hereinafter, embodiments of the present invention will be described with reference to the accompanying drawings. FIG. 1 is a perspective view showing a fusion splicer 1. The fusion splicer 1 comprises a holder-mounting part 11 on which a holder that holds optical fibers is mounted, a base member 3 on which ends of optical fibers and electrodes are disposed, a base-holding member 5 that holds the base member 3, and electrode-holding members 9 that hold electrode rods 7.

The fusion splicer 1 splices a pair of optical fibers together by fusion. A pair of holders, which are omitted in the drawing, holds optical fibers and the holders are mounted on the holder-mounting part 11. With the ends of the optical fibers butted to each other, an electric arc is generated between a pair of electrode rods 7 to melt and splice the ends of the optical fibers.

FIG. 2 is a perspective view showing the base-holding member 5 and FIG. 3 is an exploded perspective view showing the base-holding member 5, the base member 3, and the like. Also, FIG. 4 is a plan view of the base-holding member 5 and the like, FIG. 5 is a cross sectional view of A-A line in FIG. 4, and FIG. 6(*a*) is a cross sectional view of B-B line in FIG. 4. The base-holding member 5 holds the base member 3.

The base member 3 is detachable from the base-holding member 5 without using, for example, tools and the like. That is, although the base-holding member 5 is fixed to the body of the fusion splicer, the base member 3 is detachably fixed to the base-holding member 5. The base-holding member 5 has a positioning mechanism that positions the base member 3 on the base-holding member 5.

Here, a reference part that decides the position of the base member 3 on the base-holding member 5 in a direction parallel to an optical fiber installation surface 2, which is an upper surface of the base member 3, is called a horizontal positioning reference part. Also, a reference part that decides the position of the base member 3 on the base-holding member in a direction vertical to the optical fiber installation surface 2 (the direction vertical to the horizontal positioning reference part), which is the upper surface of the base member 3, is called a vertical positioning reference part 6. That is, the horizontal positioning reference part and the vertical positioning reference part 6 are provided on the base-holding member 5. A method for fixing the base member 3 to the base-holding member 5 and its positioning mechanism (the horizontal positioning reference part) will be described in detail later.

The base member 3 is, for example, an integrated member on which V-shaped grooves 15 and V-shaped grooves 23 are formed in directions such that the groove 15 and the groove 23 are intersecting with each other at right angles. Also, a bore 19 is formed at an approximate center of the base member 3. The V-shaped grooves 15 are the parts that hold optical fibers. The V-shaped grooves 23 are the parts that hold the electrode rods 7. The V-shaped grooves 15 are formed on a same straight line facing each other with the bore 19 in between. Similarly, the V-shaped grooves 23 are formed on a same straight line facing each other with the bore 19 in between. Thus, the optical fibers and the electrode rods 7 are positioned by the V-shaped grooves 15 and 23.

Such a composition of the base member 3 may allow an alignment of the optical fibers to be performed only in one direction that is parallel to the direction of the central axis of the optical fibers. For example, a holder to which the optical fibers are fixed may be mounted on the holder-mounting part 11, and alignment can be done by moving the holder-mounting part 11 in only one direction that is parallel to the axis direction of the optical fibers.

The base member 3 is fixed by being pressed against the base-holding member 5 from above. For example, the base member 3 is pressed against the base-holding member 5 from above by the electrode-holding members 9 via the electrode rods 7 and fixed with screws 17 that can be screwed by hand. That is, the electrode rods 7 held by the electrode-holding members 9 are disposed on the V-shaped grooves 23 of the base member 3, the electrode-holding members 9 are fixed to the base-holding member 5 by the screws 17, the electrode-holding members 9 and the base-holding member 5 interpose the base member 3 and the electrode rods 7, and the electrode rods 7 press the base member 3 from above to fix the base member 3. In this state, electrodes formed on the electrode-holding members 9 (omitted in the drawings) contact the electrode rods 7 and are electrically connected with the electrode rods 7. Therefore, the electrode rods 7 can carry electrical current.

When the base member 3 is fixed to the base-holding member 5, a front face of an electrode head 21 is in contact with a side face of the base member 3 as shown in FIG. 6(*a*). Therefore, the position of the tip of the electrode rod 7 on the base member 3 is decided.

A pair of cameras 25 are provided at a part of the base-holding member 5 on which the base member 3 is installed. The cameras 25 are formed at a part corresponding to the bore 19 when the base member 3 is installed. The cameras 25 can take images of tip parts of the optical fibers installed on the base member 3 through the bore 19. Therefore, the operator can check the positions of the tip parts of the optical fibers and the like through the cameras 25.

As shown in FIG. 5, recess portions 13 are provided on both side parts of the installation surface for the base member 3 on the base-holding member 5. The recess portions 13 are parts that are cut out downward from the installation surface for the base member 3. By providing the recess portions 13, fingers can be inserted into the recess portions 13 so that the fingers do not interfere with the base-holding member 5 when detaching the base member 3 from above, which, therefore, facilitates the detaching operation of the base member 3.

As shown in FIG. 5 and FIG. 6(*a*), the installation surface on which the base member 3 is installed is formed flat. Thus, cleaning of the installation surface for the base member 3 is easy. Here, let a part of the base-holding member 5 on which the base member 3 is disposed be a base-member containing part 4 (see FIG. 3). That is, the bottom surface of the base member 3 is in contact with an upper surface of the base-member containing part 4 so that positioning in the vertical direction is performed. Therefore, at least a part of the vertical positioning reference part 6 is the upper surface of the base-member containing part 4 formed on the base-holding member 5.

However, if the upper surface of the base-member containing part 4 is a flat surface, there is a possibility that there may be minute foreign substances remaining on the upper surface of the base-member containing part 4 at the time of attaching and detaching the base member 3. If there are such remaining foreign substances, the foreign substances may be caught between the base member 3 and the base-holding member 5, causing a height shifting or a tilt of the base member 3.

However, such foreign substances are likely to be accumulated mainly in corners of the borders between the installation surface for the base member 3 and sidewalls of the base-holding member 5. For this reason, chamfered parts 29 are formed at lower edge parts of the base member 3. The chamfered parts 29 are preferably 0.5 mm or more C-chamfered, for example. In this way, the foreign substances can be kept away by the chamfered parts 29. Therefore, position shifting and the like of the base member 3 can be suppressed.

In order to prevent foreign substances from being caught in a gap between the base-holding member 5 and the base member 3, protrusion portions 33 may be formed on the installation part for the base member 3 as shown in FIG. 6(*b*). For example, the protrusion portions 33 are formed at a plurality of places away from the sidewalls, and raising the base member 3 by being disposed on the protrusion portions 33 can suppress the position shifting and the like even if foreign substances are accumulated below the protrusions 33. That is, if the protrusion portions 33 are formed on the upper surface of the base-member containing part 4, at least a part of the vertical positioning reference part 6 is the contacting parts between the protrusion portions 33 and the base member 3.

It is not limited that the protrusion portions 33 are formed on the upper surface of the base-member containing part 4, and the protrusion portions 33 may be formed on inner sides of the sidewalls. In this case, there may be a gap formed between the upper surface of the base-member containing part 4 and the protrusion portions 33. That is, the protrusion portions 33 are required to be formed above the base-member containing part 4.

The electrode head 21 is provided at one end of the electrode rod 7. The end opposite to the electrode head 21 of the electrode rod 7 is an electrode portion. The electrode head 21 is an insulating portion having a larger diameter than the electrode rod 7 and held by the electrode-holding member 9. That is, the electrode rod 7 is held by the electrode-holding member 9.

The holding mechanism for the electrode rod 7 (the electrode head 21) by the electrode-holding member 9 is not particularly specified as long as holding the electrode rod 7 (the electrode head 21) is possible. However, electrode-holding member 9a shown in FIG. 7(a) and FIG. 7(b) can also be used.

As shown in FIG. 7(a), the electrode-holding member 9a has an elastic portion 35 that presses the electrode head 21 from behind. On a part opposite to the elastic portion 35, provided is a wall portion 39 to which a front face of the electrode head 21 is pressed by the elastic portion 35. Since the elastic portion 35 easily deforms elastically in a direction moving away from the wall portion 39, the electrode head 21 can be interposed and held between the elastic portion 35 and the wall portion. That is, when the electrode rod 7 is disposed on the base member 3, the front face of the electrode head 21 is in contact with the wall portion 39 and the rear face of the electrode head 21 is in contact with the elastic portion 35. Therefore, the electrode rod 7 is fixed being pressed against the base member 3 by the elastic portion 35.

On this occasion, a bore 37 is provided at the center of the electrode head 21. Also, a protrusion is formed on the inner face of the tip of the elastic portion 35. Therefore, the center position of the electrode head 21 can be positioned by placing the protrusion into the bore 37.

When the electrode rod 7 is disposed on the base member 3, the front face of the electrode head 21 contacts the side face of the base member 3. At this time, the elastic portion 35 is slightly pushed back by the electrode head 21. For this reason, a clearance occurs between the electrode head 21 and the wall portion 39.

Thus, by matching the front face position of the electrode head 21 and the side face position of the base member 3, the tip position of the electrode rod 7 in its longitudinal direction to the base member 3 can be positioned. The tip position of the electrode rod 7 in the horizontal direction is positioned by the V-shaped groove 23.

As described above, the electrode-holding member 9a is fixed to the base-holding member 5 by the screw 17. On this occasion, an electrode of the electrode-holding member 9a is pressed against the electrode rod 7 to be electrically connected. Also, the electrode rod 7 is pressed against the base member 3 (the V-shaped groove 23) by the electrode-holding member 9a. Therefore, the base member 3 is pressed against the base-holding member 5. Thus, the electrode rod 7 can be fixed.

Next, positioning of the base member 3 in the horizontal direction will be described. As shown in FIG. 8, the base member 3 is an approximately rectangular parallelepiped and a cutout portion 31 is provided in part. The cutout portion 31 is made by, for example, cutting in such a manner that a rectangular-shaped corner is made at an angle of 45° between two side faces that intersect with each other.

FIG. 9(a) is a plan view of the base-holding member 5 before installing the base member 3. As mentioned above, the cameras 25 are disposed under the installation part for the base member 3 on the base-holding member 5. Also, the recess portions 13 are formed on both side parts that face each other. A female screw 41 to which the screw 17 of the electrode-holding member 9 (9a) is to be fixed is also formed.

The base-member containing part 4 on which the base member 3 is installed has wall portions surrounding at least a part of the base member 3 (at least in two directions). The size of the base-member containing part 4 surrounded by the wall portions is set to be slightly larger than the size of the base member 3. A pressing member 27 is fixed to a part of the base-member containing part 4 surrounded by the wall portions. The pressing member 27 is, for example, a plunger provided with an elastic member inside.

As shown in FIG. 9(b), when the base member 3 is disposed on the base-holding member 5, the pressing member 27 is located at the part corresponding to the cutout portion 31. At this time, the pressing member 27 presses the base member 3 in a direction approximately vertical to the face of the cutout portion 31, for example. That is, the pressing member 27 can press the base member 3 in the direction that is parallel to the optical fiber installation surface 2.

FIG. 10(a) is a schematic view showing a positioning status in this case. When the pressing member 27 (which is omitted in the drawings and the same applies hereafter) presses the cutout portion 31 (C in the drawing), the base member 3 is pushed against opposing inner faces of the wall portions of the base-member containing part 4. As mentioned above, since the pressing member 27 presses the cutout portion 31 in the direction of the cutout face, the base member 3 is pressed in a direction that is oblique to both long sides and short sides of the base member 3. Therefore, outer surfaces of the base member 3 are in contact with two inner faces (in two directions) of the base-member containing part 4 by being pressed against the same. The outer surfaces of the base member 3 and the inner faces of the base-holding member 5 that are in contact with each other are plane surfaces, for example.

As above, the base member 3 is pressed by an inner surface (D in the drawing) while being pressed by the other inner surface (E in the drawing). That is, the base member 3 is pressed from at least two directions other than from the pressing part by the pressing member 27.

In this case, the inner surfaces of the wall portions of the base-holding member 5 function as a horizontal positioning reference part 8. Therefore, the pressing member 27 can press the base member 3 against the horizontal positioning reference part 8, which is at least in two different directions that are parallel to the optical fiber installation surface 2. That is, the outer surfaces of the base member 3 are in surface contact with the inner surfaces of the base-holding member 5 which function as the horizontal positioning reference part 8 so that the base member 3 can be positioned at least at two positions by being pressed by the pressing member 27.

As above, the inner surfaces of the base-member containing part 4 formed on the base-holding member 5 can function as at least a part of the horizontal positioning reference part 8. That is, if the inner surfaces of the base-member containing part 4 and the outer side surfaces of the base member 3 are plane surfaces, at least a part of the horizontal positioning reference part 8 is the contacting surfaces of the inner surfaces of the base-member containing part 4 and the outer side surfaces of the base member 3. In this case, since the base member 3 is disposed with at least three reference positions including the pressing part by the pressing member 27, the base member 3 is positioned in the horizontal direction (the direction parallel to the optical fiber installation surface 2 (the surface on which V-shaped grooves 15 and the like are formed) of the base member 3) with certainty.

The position of the base member 3 in the height (vertical) direction is decided by being pressed against the upper surface (or the protrusion portions 33) of the base-holding member 5 (the base-member containing part 4) by the electrode-holding member 9 or 9*a* as described above. Therefore, the base member 3 can be installed in an accurate position with certainty even after the base member 3 is once detached and then inserted again.

In the present invention, it is not limited to the case in which the base member 3 and the horizontal positioning reference part 8 are in surface contact. For example, as shown in FIG. 10(*b*), protrusion portions 43*a* may be formed at a plurality of locations on the inner surfaces of the base-holding member 5. The protrusion portions 43*a* are formed on the inner surfaces of the base-holding member 5, which are in at least two directions different from the pressing direction of the pressing member 27 respectively.

The protrusion portion 43*a* may be a hemisphere or a semi-cylinder. If the protrusion portion 43*a* is a hemisphere, the base member 3 and the top part of the protrusion portion 43*a* are in point contact. If the protrusion portion 43*a* is a semi-cylinder, the base member 3 and the top part of the protrusion portion 43*a* are in line contact. The shape of the protrusion 43*a* is not limited to the examples shown in the drawings, but may be in any shapes.

In this case, the top part of the protrusion portion 43*a* functions as the horizontal positioning reference part 8. That is, the base member 3 is in point or line contact with the top parts of the protrusion portions 43*a* that function as the horizontal positioning reference part 8, and the base member 3 is positioned at least at two locations by being pressed by the pressing member 27. In this way, since the base member 3 is disposed with at least three reference positions including the pressing part by the pressing member 27 so that the base member 3 is positioned in the horizontal direction with certainty as similarly as shown in FIG. 10(*a*).

Also, in the present invention, instead of providing the protrusion portions 43 on the inner surfaces of the base-holding member 5, protrusion portions 43*b* may be provided on the outer side faces of the base member 3. For example, as shown in FIG. 10(*c*), the protrusion portions 43*b* may be formed at a plurality of locations of the outer surfaces of the base member 3. Since the pressing direction of the pressing member 27 is vertical to the face of the cutout portion 31, the protrusion portions 43*b* are formed in at least two directions that are different from the pressing direction respectively.

The protrusion portion 43*b* may be a hemisphere or a semi-cylinder. If the protrusion portion 43*b* is a hemisphere, the inner surfaces of the base-holding member 5 and the top part of the protrusion portion 43*b* are in point contact. If the protrusion portion 43*b* is a semi-cylinder, the inner surfaces of the base-holding member 5 and the top part of the protrusion portion 43*b* are in line contact. The shape of the protrusion 43*b* is not limited to the examples shown in the drawings, but may be in any shapes.

In this case, the top part of the protrusion portion 43*b* functions as the horizontal positioning reference part 8. That is, the inner surfaces of the base-holding member 5 is in point or line contact with the top parts of the protrusion portions 43*b* that function as the horizontal positioning reference part 8, and the base-holding member 5 is positioned at least at two locations by being pressed by the pressing member 27. That is, the contacting point of the protrusion portions 43*b* and the inner surfaces of the base-member containing part 4 can function as at least a part of the horizontal positioning reference part 8. In this way, the base member 3 is disposed with at least three reference positions including the pressing part by the pressing member 27 so that the base member 3 is positioned in the horizontal direction with certainty as similarly as shown in FIG. 10(*a*).

A combination of the protrusion portions 43*a* and 43*b* is also possible. For example, the protrusion portions 43*a* may be provided on at least one of the short side or the long side of the base member 3 and the base-holding member 5 and the protrusion portions 43*b* may be provided on the other side. Or, the protrusion portions 43*a* and 43*b* may be in contact with each other. Or, a combination of the protrusion portions 43*a* or 43*b* and the inner surfaces of the base-holding member 5 may be possible. That is, the outer surface of the base member 3 and the inner surface of the base-holding member 5 may be in surface contact in one direction, while the base member 3 and the base-holding member 5 are in contact through the medium of the protrusion portions 43*a* or 43*b* in the other direction.

Also, in the present invention, it is not limited to the case in which the inner surface of the base-holding member 5 and the outer surface of the base member 3 are in contact. For example, as shown in FIG. 11(*a*), a bore 47 may be formed on the base member 3 and a pin 45 may be erected from the base-holding member 5.

The bore 47, which is a through hole, is formed on one location of the base member 3. The pin 45 has a smaller outer diameter than that of the bore 47. When the base member 3 is disposed such that the pin 45 inserts into the bore 47, the outer surface of the base member 3 and the inner surface of the base-holding member 5 are in contact in at least one direction. In the example shown in the drawing, the long sides of the base member 3 are in contact with the inner surfaces of the base-holding member 5.

Meanwhile, the short sides of the base member 3 are not in contact with the inner surfaces of the base-holding member 5 and gaps are formed. At this time, the pin 45 is in contact with the inner surface of the bore 47.

When the pressing member 27 presses the cutout portion 31 (C in the drawing), the outer surfaces of the base member 3 on its long sides are pushed against the opposing inner surfaces of the wall portion of the base-holding member 5 (D in the drawing). Also, the pin 45 is pushed against the inner surface of the bore 47 (F in the drawing). As mentioned above, since the pressing member 27 presses the cutout portion 31 in the direction of its cutout face, the base member 3 is pressed in a direction that is oblique to the sides of the base member 3. That is, except for the pressing part from the pressing member 27, the base member 3 is pressed from at least two different directions.

In this case, the pin 45 and the inner surface of the base-holding member 5 function as the horizontal positioning reference part 8. That is, the surfaces of the base member 3 on its one side are in contact with the inner surfaces of the base-holding member 5 as well as the inner surface of the bore 47 of the base member 3 is in contact with the pin 45. The pressing direction (F in the drawing) of the pin 45 against the inner surface of the bore 47 is different from the pressing direction (D in the drawing) of the inner surface of the base-holding member 5 against the outer surface of the base member 3. That is, the positioning is decided by being pressed by the pressing member 27 at least at two locations.

Thus, since the base member 3 is disposed with at least three reference places including the pressing part from the pressing member 27, the base member 3 is positioned in the horizontal direction with certainty as similarly as in FIG. 10(a).

The above-mentioned protrusion portions 43a or 43b may be formed for contact between the outer surface of the base member 3 and the inner surface of the base-holding member 5. Also, the short sides of the base member 3 may be in contact with the inner surfaces of the base-holding member 5a and a clearance may be provided between the long side of the base member 3 and the inner surface of the base-holding member 5. Even in this case, positioning can be decided at least at two locations by contacting the bore 47 with the pin 45.

Also, in the present invention, it is not limited to the case in which there is only one pin 45. For example, as shown in FIG. 11(b), a plurality of the bores 47 may be formed on the base member 3 and a plurality of the pins 45 may be erected from the base-holding member 5.

The bores 47, which are through holes, are formed at a plurality of locations (two locations in the drawing) of the base member 3. In this embodiment, a short side of the base member 3 is pressed. Therefore, there is no need to provide the cutout portion 31 on the base member 3. The bore 47 is disposed in such a manner that the pressing force is applied between each of the contacting points within a range that connects two points where the inner surface of each of the bores 47 contacts with each of the pins 45 (H in the drawing) when the pressing part is pressed by the member 27. That is, the end face opposing the two bores 46 is pressed within the range that passes through the center between the bores 47.

When the base member 3 is disposed so that the pins 45 are inserted into the bores 47 respectively, the outer surface of the base member 3 is not in contact with the inner surface of the base-holding member 5. When the pressing member 27 presses the cutout portion 31 (C in the drawing), the pin 45 is pressed against the inner surface of each of the bores 47 (F and G in the drawing).

In this case, the pins 45 function as the horizontal positioning reference part 8. That is, the pin 45 contacts with each of the inner surfaces of the bores 47 of the base member 3. Here, if the pitch of the bores 47 is made to be slightly different from the pitch of the pins 45, the contacting positions of the pins 45 with each of the bores 47 (the positions in the inner circumference direction in regard to the pressing part) become different. In this way, it is possible to make the pressing directions F and G of the pins 45 different from each other.

As above, according to the present embodiment, since the base member 3 and the base-holding member 5 are separated bodies, attaching/detaching the base member 3 is easy. For this reason, fusion between various types of optical fibers is possible, and maintenance and exchanging operations of the base member 3 are easy. Also, because of the simple shape of the base member 3, it is possible to suppress the processing cost of expensive ceramic-made components.

For example, on the base member 3, it is possible to dispose not only a single-core optical fiber but an optical fiber tape core wire in which a plurality of optical fibers are aligned and spliced together. In this case, the base member 3 that splices optical fiber tape core wires with an ordinary pitch of 250 μm can be exchanged for the base member 3 that splices optical fiber tape core wires with a pitch of 200 μm.

Furthermore, fusion splicing of a 200 μm pitched optical fiber tape core wire and a 250 μm pitched optical fiber tape core wire (the glasses are both 125 μm) is possible by setting one of the V-shaped groove 15 of the base member 3 for 250 μm pitched optical fiber tape core wire and the other V-shaped groove 15 for 200 μm pitched optical fiber tape core wire.

In this case, the 200 μm pitch is enlarged to a 250 μm pitch. In this way, fusion splicing is possible under the same conditions as splicing ordinary 250 μm pitched optical fiber tape core wires together. However, the 250 μm pitch may be narrowed to 200 μm, or both may be made into 225 μm.

Other than that, fusion splicing of optical fiber tape core wires of 200 μm pitch (usually 250 μm pitch), fibers with different fiber diameters, fibers with coat/glass of 125/80, 250/125 and 125/80, or the like are possible by only exchanging to the base member 3 having the V-shaped grooves corresponding to each case.

Also, the base member 3 is positioned by being pressed by the pressing member 27 against the horizontal positioning reference part 8 of the base-holding member 5. Therefore, when attaching the base member 3, position shifting of the base member 3 in the direction parallel to the optical fiber installation surface 2 can be prevented.

Also, with the position in the direction parallel to the optical fiber installation surface 2 being decided as above, pressing the base member 3 from above against the vertical positioning reference part 6 by the electrode-holding members 9 or 9a, which can flow electrical current to the electrode rods 7, can decide the position of the base member 3 in the height direction (vertical position) so that the position of the base member 3 can be fixed.

At this time, forming the chamfered parts 29 on the lower edge of the base member 3 can prevent foreign substances remaining on the installation part for the base member 3 on the base-holding part 5 from being caught between the base member 3 and the base-holding member 5. For this reason, it is possible to suppress the problems of height shifting or tilt of the base member caused by foreign substances such as dust that are caught between the base member and the base-holding member.

Also, by forming the protrusion portions 33, which contact the bottom surface of the base member 5, on the upper surface of the base-holding member 5, not the entire bottom surface of the base member 3 is in contact with the base-holding member 5. Position shifting and the like of the base member 3 can be prevented with more certainty.

Also, before disposing the electrode 7 on the base member 3, the electrode-holding member 9a can hold the electrode rod 7 with certainty by interposing the electrode head 21 between the wall portion 39 and the elastic portion 35. Also, when the electrode rod 7 is disposed on the base member 3, the front face of the electrode head 21 moves away from the wall portion 39 to be in contact with the end part of the base member 3. Thus, the tip of the electrode rod 7 can be positioned to the base member 3 in its longitudinal direction.

Also, providing the recess portions 13 on both side parts of the part of the base-holding member 5 that holds the base member 3 can suppress the interference between fingers and the base-holding member 5 when the base member 3 is picked up between fingers. For this reason, the base member 3 can be easily picked up by fingers. Therefore, attaching/detaching operation of the base member 3 is easy.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

For example, although it is described in the above embodiments that the pressing member 27 is provided at a part of the installation part for the base member 3 and the base member 3 is positioned by being pressed by the pressing member 27, the present invention is not limited thereto. For example, the base member 3 can be positioned without providing the pressing member 27 by making the size of the base-member containing part 4 on which the base member 3 is installed slightly larger than the size of the base member 3. In this case, as shown in FIG. 10(b), it is preferable that a plurality of the protrusion portions 43a are formed on the inner surface of the base-holding member 5 or, as shown in FIG. 10(c), a plurality of the protrusion portions 43b are formed on the outer surface of the base member 3.

Also, as shown in FIG. 11(a), in a structure in which a bore 47 is formed on the base member 3 and a pin 45 is formed on the base-holding member 5, it is possible to omit the pressing member 27 by providing two or more bores 47 and the pins 45 and making the clearance of the bores 47 and the pins 45 sufficiently small.

It is also possible to provide a positioning mechanism for the base member 3 separately and positions of the tips of the optical fibers can be checked by the cameras 25 to adjust the position of the base member 3.

Also, although an example in which the base member 3 has V-shaped grooves 15 and 23 that hold optical fibers and the electrode rods 7 respectively is described in the above embodiments, the present invention is not limited thereto. For example, only the V-shaped grooves 15 holding the optical fibers may be formed on the base member 3, whereas the electrode-holding member 9 is not detachable from the base-holding member 5 and the electrode rods 7 are fixed to the base-holding member 5.

According to the present invention, a fusion splicer that can fuse optical fibers of various types together can be provided.

According to the present invention, a base member and a base-holding member are separated bodies, and the base member can be attached/detached easily. For this reason, exchanging the base member is easy and fusion splicing of various types of optical fibers is possible. On this occasion, the positioning of the base member to the base-holding member is easy because of a horizontal positioning reference part. Therefore, positioning of the base member is easy when the base member is detached to be exchanged and installed to the base-holding member once again.

If the inner surface of the base-holding member is made to be such a horizontal positioning reference part, the base member can be positioned easily by being pressed against the base-holding member by a pressing member.

Also, if the inner surface of the base-member containing part and the outer side surface of the base member are plane surfaces, the contacting surface of the inner surface of the base-member containing part and the outer side surface of the base member can function as at least a part of the horizontal positioning reference part.

Also, the horizontal positioning reference part may be in the forms of lines or points instead of planes. For example, if protrusion portions formed on either the outer surface of the base member or the inner surface of the base-holding member are made to be the horizontal positioning reference part, the base member and the base-holding member can be in point contact or in line contact.

Also, the positioning of the base member to the base-holding member is easy by pressing the base member against the horizontal positioning reference part of the base-holding member by the pressing member.

At this time, pressing the base member against the horizontal positioning reference part in at least two directions that are different from each other and parallel to the optical fiber installation surface allows the positioning of the base member with certainty. That is, since positioning is done at least at three locations including the part pressed by the pressing member, the base member can be positioned to the base-holding member with certainty.

Also, a pin formed on the base-holding member can be the horizontal positioning reference part. Inserting the pin into a bore formed on the base member and pressing the base member by the pressing member can position the base member to the base-holding member by the pin.

Also, if at least a part of a vertical positioning reference part is an upper surface of the base-member containing part formed on the base-holding member, the positioning of the base member in the vertical direction is easy.

Also, forming protrusion portions, which contacts the bottom surface of the base member, on the upper surface of the base-member containing part prevents the entire bottom surface of the base member from contacting the base-holding member. Therefore, it is possible to suppress problems of height shifting or tilt of the base member caused by foreign substances such as dust that are caught between the base member and the base-holding member.

Also, the base member can be positioned in its height direction by being pressed from above and fixed.

At this time, the base member and electrode rods can be fixed simultaneously by providing grooves on the base-holding member for holding electrode rods, disposing the electrodes rods in the grooves on the base member, and pressing the base member from above by the electrode rods.

Also, the electrode-holding member can hold an electrode head formed on the electrode rod, and, before disposing the electrode on the base member, the electrode-holding member can hold the electrode rod with certainty by interposing the electrode head between a wall portion and an elastic portion. Also, when the electrode rod is to be disposed on the base member, the front face of the electrode head moves away from the wall portion to be in contact with the end part of the base member. Thus, the tip of the electrode rod can be positioned to the base member.

Also, providing recess portions on both side parts of the base-holding member can suppress the interference between fingers and the base-holding member when the base member is picked up between fingers. For this reason, the base member can be easily picked up by fingers. Therefore, attaching/detaching operation of the base member is easy.

Also, according to the present invention, an alignment of optical fibers is to be performed only in one direction that is parallel to the direction of the central axis of the optical fibers.

What is claimed is:

1. A fusion splicer that splices optical fibers together, comprising:
   a base member having grooves to hold optical fibers;
   a base-holding member that holds the base member;
   a first pressing member; and
   a second pressing member, wherein the base member is detachable from the base-holding member;
   a horizontal positioning reference part, which decides the position of the base member on the base-holding member in a direction parallel to an optical fiber installation surface on the base member, is provided on the base-holding member; and a vertical positioning reference part, which decides the position of the base member on the base-holding member in a direction vertical to the optical fiber installation surface on the base member, is provided on the base-holding member;

the first pressing member presses the base member against the horizontal positioning reference part; and the second pressing member presses the base member against the vertical positioning reference part.

2. The fusion splicer according to claim 1, wherein at least a part of the horizontal positioning reference part is an inner surface of a base-member containing part on which the base member is installed, the base-member containing part being formed on the base-holding member.

3. The fusion splicer according to claim 2, wherein
the inner surface of the base-member containing part and an outer side surface of the base member are plane surfaces;
at least the part of the horizontal positioning reference part is a contacting surface between the inner surface of the base-member containing part and the outer side surface of the base member.

4. The fusion splicer according to claim 2, wherein
a protrusion portion is formed on an outer side surface of the base member; and
at least the part of the horizontal positioning reference part is a contacting part between the protrusion portion and the inner surface of the base-member containing part.

5. The fusion splicer according to claim 1, wherein
the first pressing member presses the base member in a direction parallel to the optical fiber installation surface.

6. The fusion splicer according to claim 5, wherein
the first pressing member presses the base member against the horizontal positioning reference part which is in at least two directions that are different from each other and parallel to the optical fiber installation surface.

7. The fusion splicer according to claim 1, wherein
the horizontal positioning reference part is a pin formed on the base-holding member;
a bore is formed on the base member; and
the pin is inserted into the bore.

8. The fusion splicer according to claim 1, wherein
at least a part of the vertical positioning reference part is an upper surface of a base-member containing part on which the base member is installed, the base-member containing part being formed on the base-holding part.

9. The fusion splicer according to claim 1, wherein
a protrusion portion is formed on an upper surface of a base-member containing part formed on the base-holding member, on which the base member is to be installed; and
at least a part of the vertical positioning reference part is a contacting part between the protrusion portion and the base member.

10. The fusion splicer according to claim 1, wherein
the base member is pressed from above by the second pressing member so that the base member is pressed against the base-holding member and fixed to the base-holding member.

11. The fusion splicer according to claim 10, wherein
the second pressing member is an electrode rod;
the base member includes a groove to hold the electrode rod and an electrode-holding member, which carries electrical current to the electrode rod, is fixed to the base-holding member;
the electrode rod held by the electrode-holding member is disposed in the groove of the base member; and
the electrode rod presses the base member from above.

12. The fusion splicer according to claim 11, wherein
the electrode rod comprises an electrode head provided at one end of the electrode rod;
the electrode-holding member includes an elastic portion that presses the electrode head from its back and a wall portion against which a front face of the electrode head is pressed by the elastic portion; and,
when the electrode rod is disposed on the base member, the front face of the electrode head contacts a side face of the base member and the electrode rod is fixed being pressed against the base member by the elastic portion.

13. The fusion splicer according to claim 1, wherein
recess portions into which fingers inserted are formed on both side parts of an installation surface for the base member on the base-holding member.

14. The fusion splicer according to claim 1, wherein
the optical fibers are aligned only in one direction that is parallel to a central axis direction of the optical fibers.

* * * * *